No. 738,381. PATENTED SEPT. 8, 1903.
J. WEST.
METHOD OF MAKING ENVELOPS.
APPLICATION FILED JULY 3, 1903.
NO MODEL. 8 SHEETS—SHEET 1.
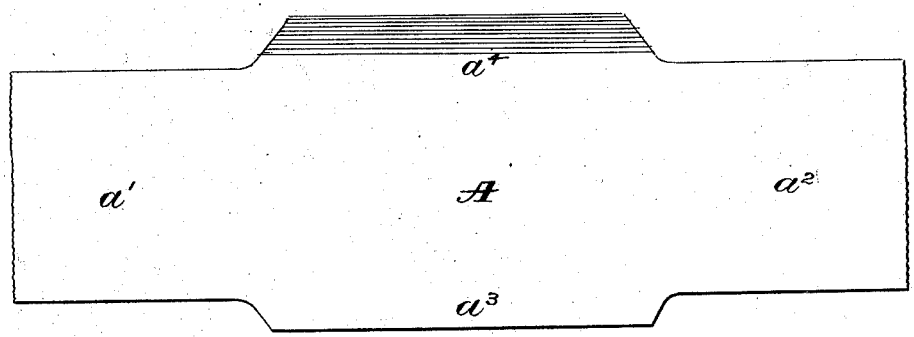
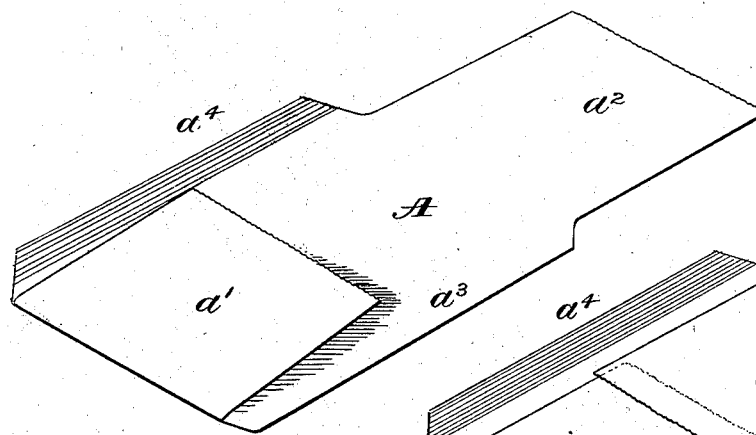
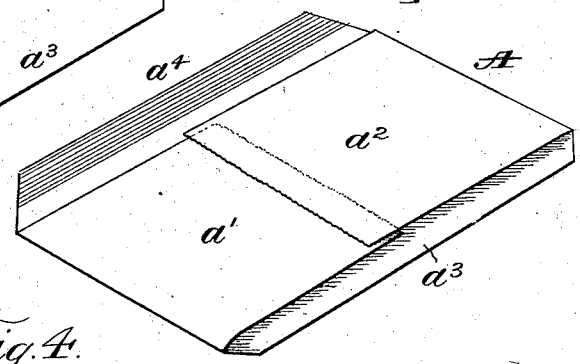
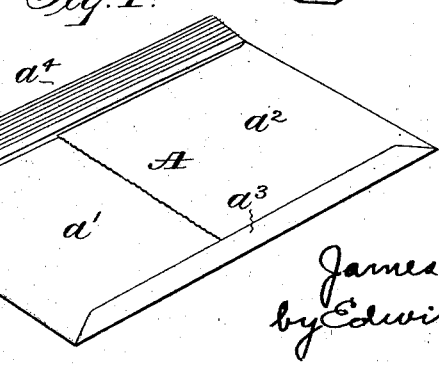
Witnesses:
Jas. E. Hutchinson.
J. L. Lawlor.
Inventor:
James West,
by Edwin J. Prindle, Atty.

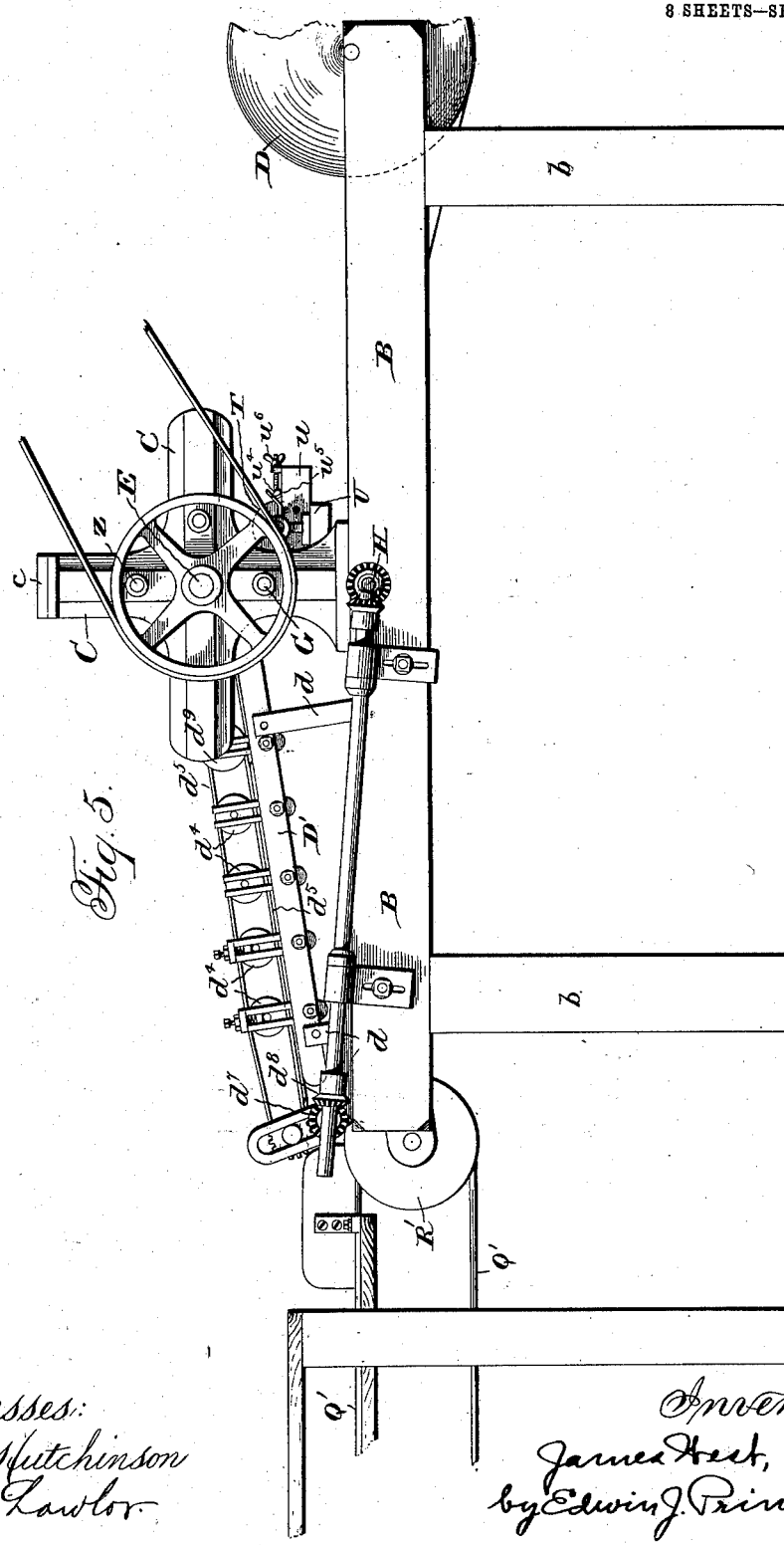

No. 738,381. PATENTED SEPT. 8, 1903.
J. WEST.
METHOD OF MAKING ENVELOPS.
APPLICATION FILED JULY 3, 1903.
NO MODEL. 8 SHEETS—SHEET 3.
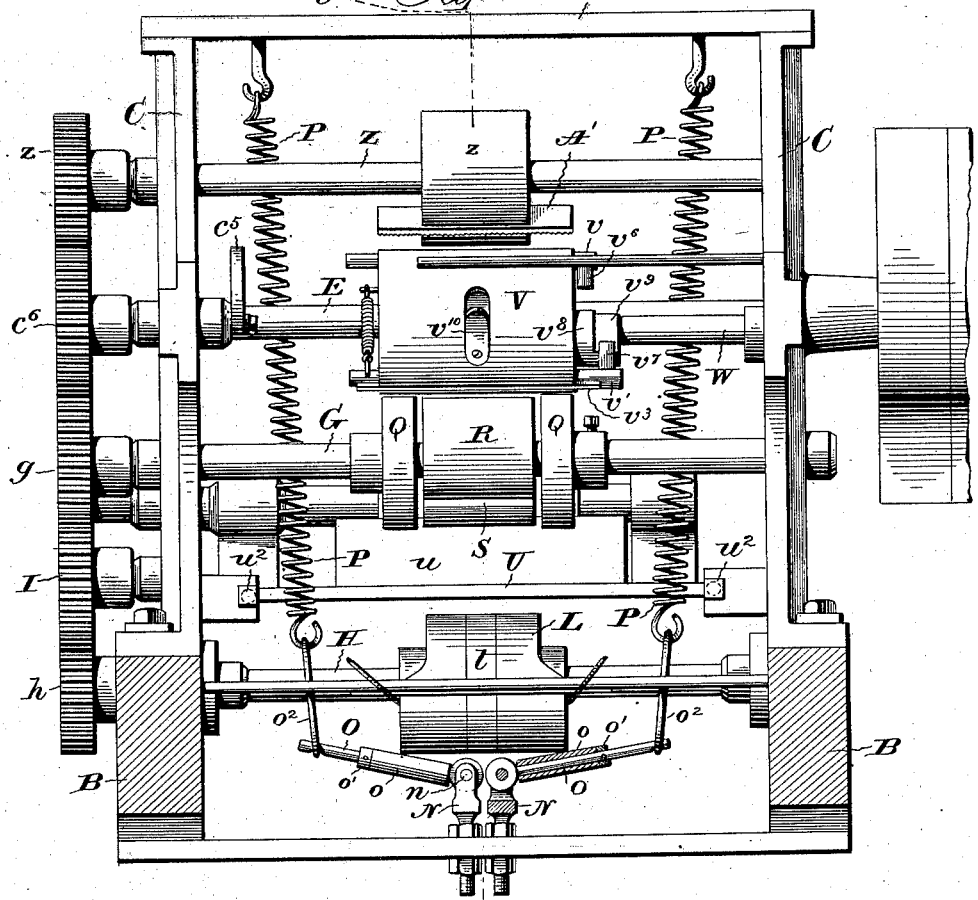
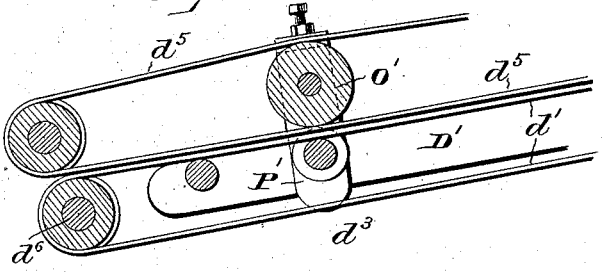
Witnesses:
Jas. E. Hutchinson
J. L. Lawlor
Inventor.
James West,
by Edwin J. Prindle,
Atty.

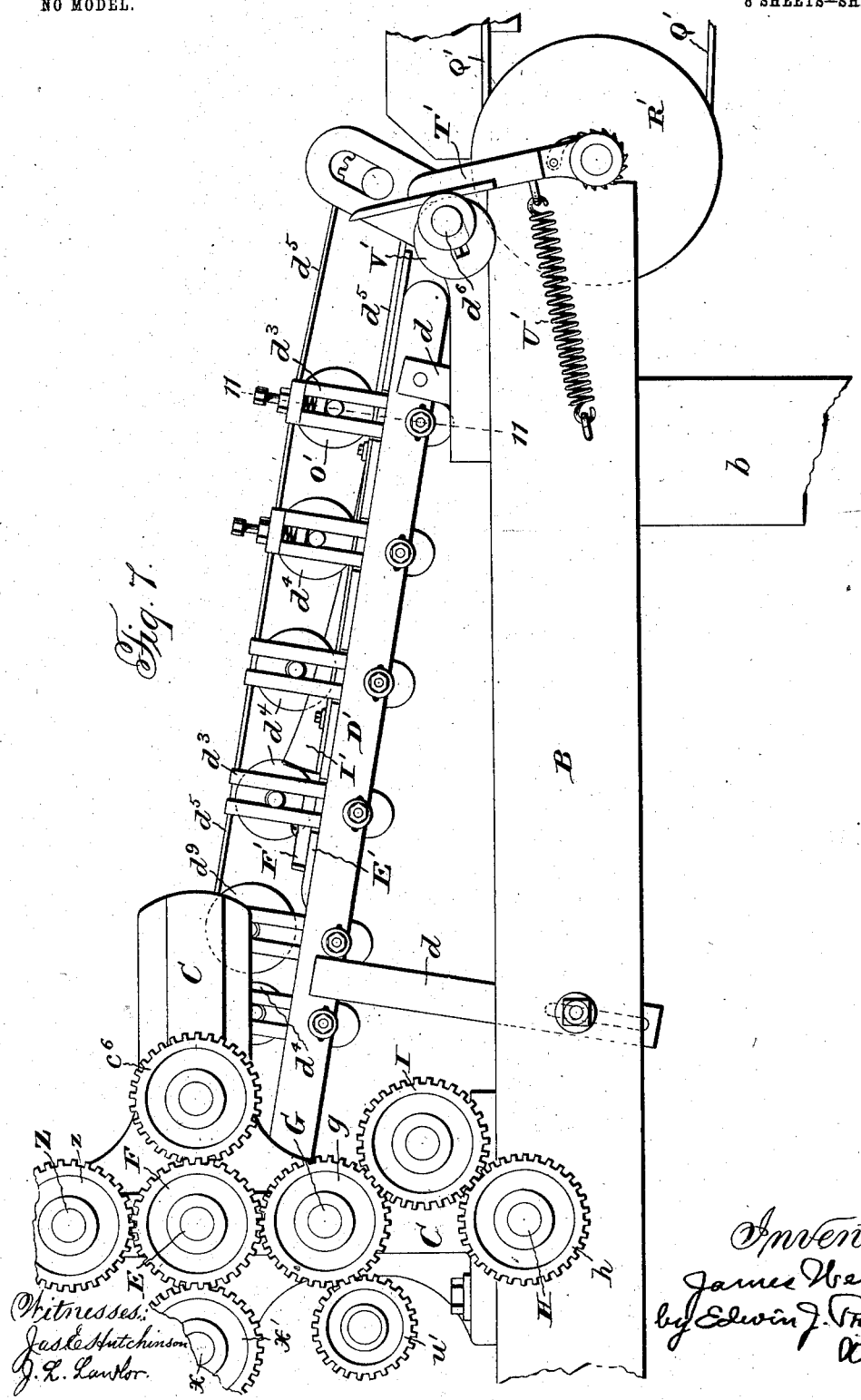

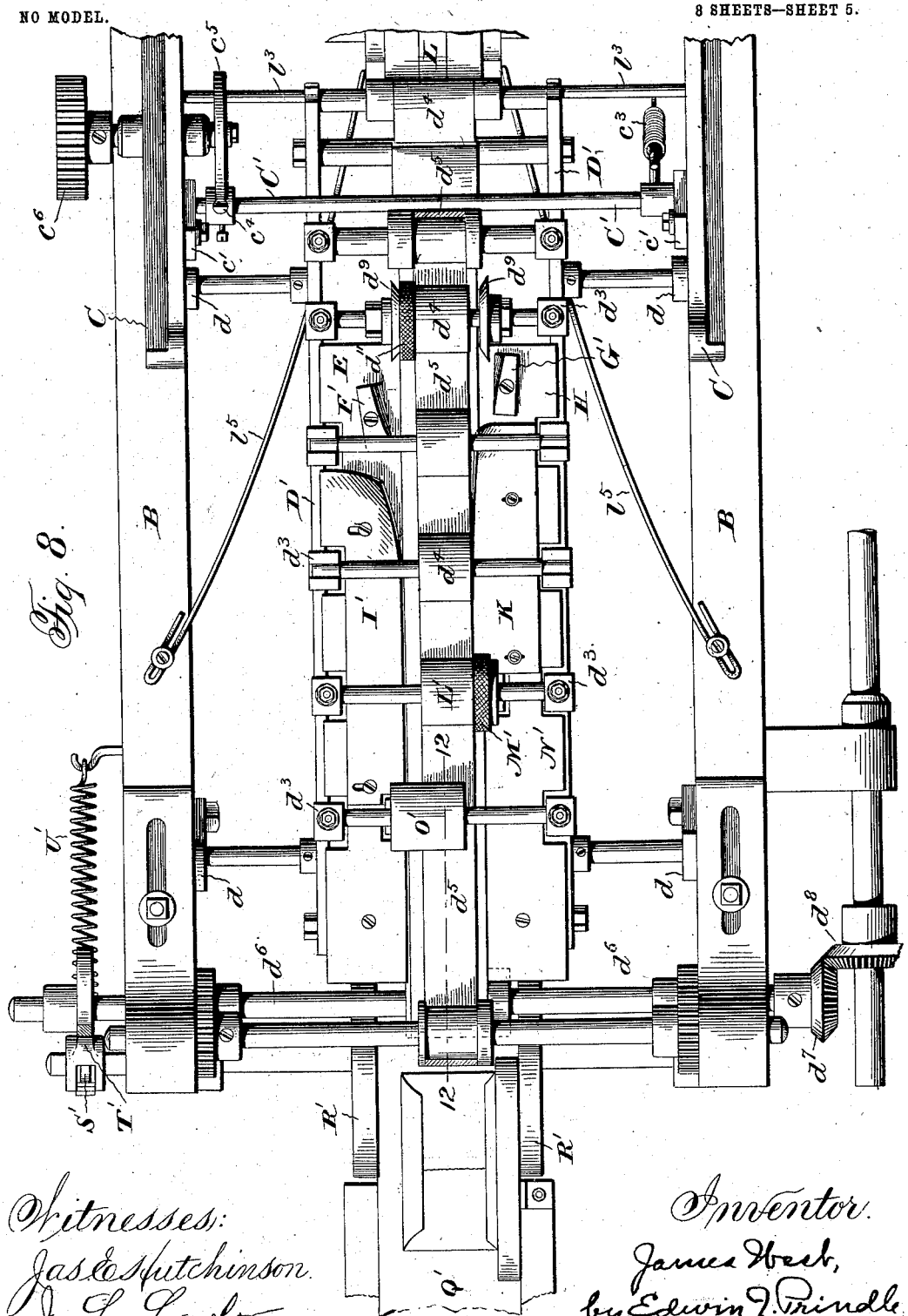

No. 738,381. PATENTED SEPT. 8, 1903.
J. WEST.
METHOD OF MAKING ENVELOPS.
APPLICATION FILED JULY 3, 1903.
NO MODEL. 8 SHEETS—SHEET 6.

Witnesses: Jas. E. Hutchinson J. L. Lawlor

Inventor. James West, by Edwin J. Prindle, Atty.

No. 738,381. PATENTED SEPT. 8, 1903.
J. WEST.
METHOD OF MAKING ENVELOPS.
APPLICATION FILED JULY 3, 1903.
NO MODEL. 8 SHEETS—SHEET 7.
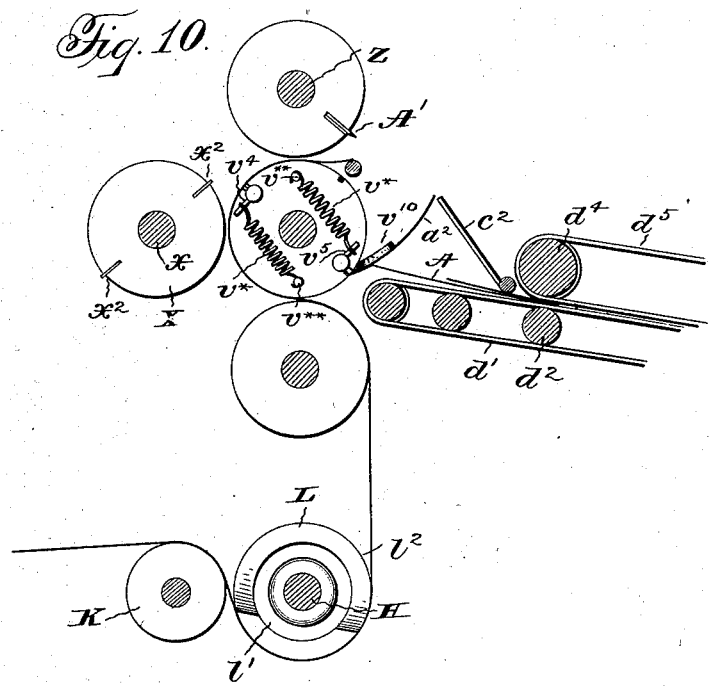
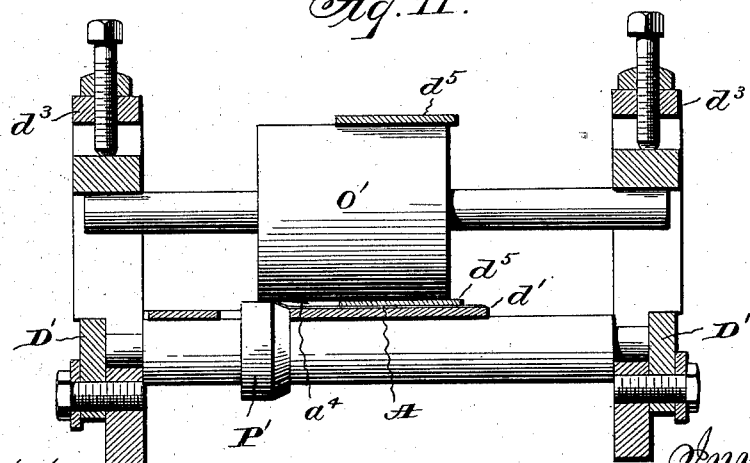

No. 738,381. PATENTED SEPT. 8, 1903.
J. WEST.
METHOD OF MAKING ENVELOPS.
APPLICATION FILED JULY 3, 1903.
NO MODEL. 8 SHEETS—SHEET 8.
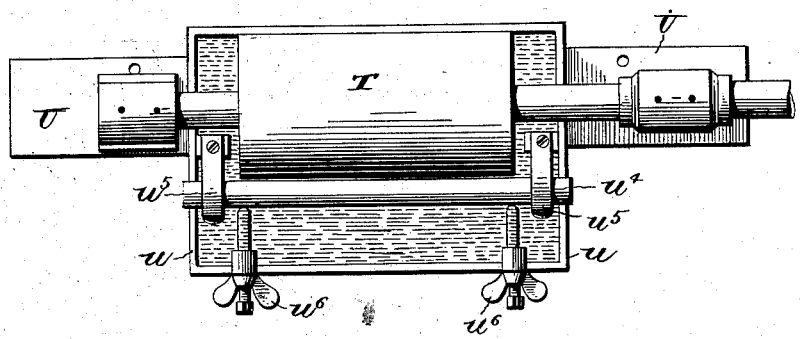
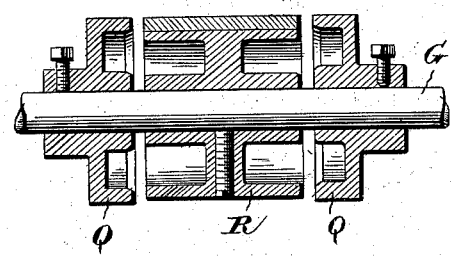
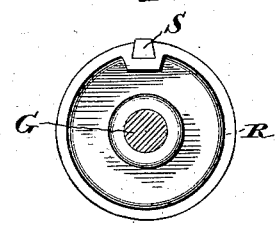
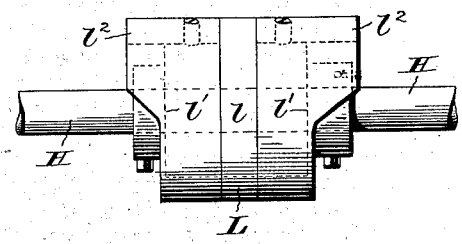
Witnesses:
Jas. E. Hutchinson
J. L. Lawlor
Inventor.
James West,
by Edwin J. Prindle,
Atty.

No. 738,381. Patented September 8, 1903.

UNITED STATES PATENT OFFICE.

JAMES WEST, OF BROOKLYN, NEW YORK, ASSIGNOR TO SECURITY PAPER SPECIALTY COMPANY, OF NEW YORK, N. Y., A CORPORATION OF NEW YORK.

METHOD OF MAKING ENVELOPS.

SPECIFICATION forming part of Letters Patent No. 738,381, dated September 8, 1903.

Application filed July 3, 1902. Serial No. 114,255. (No model.)

*To all whom it may concern:*

Be it known that I, JAMES WEST, of Brooklyn, in the county of Kings, and in the State of New York, have invented a certain new and useful Improvement in Methods of Making Envelops; and I do hereby declare that the following is a full, clear, and exact description thereof, reference being had to the accompanying drawings, in which—

Figure 9:
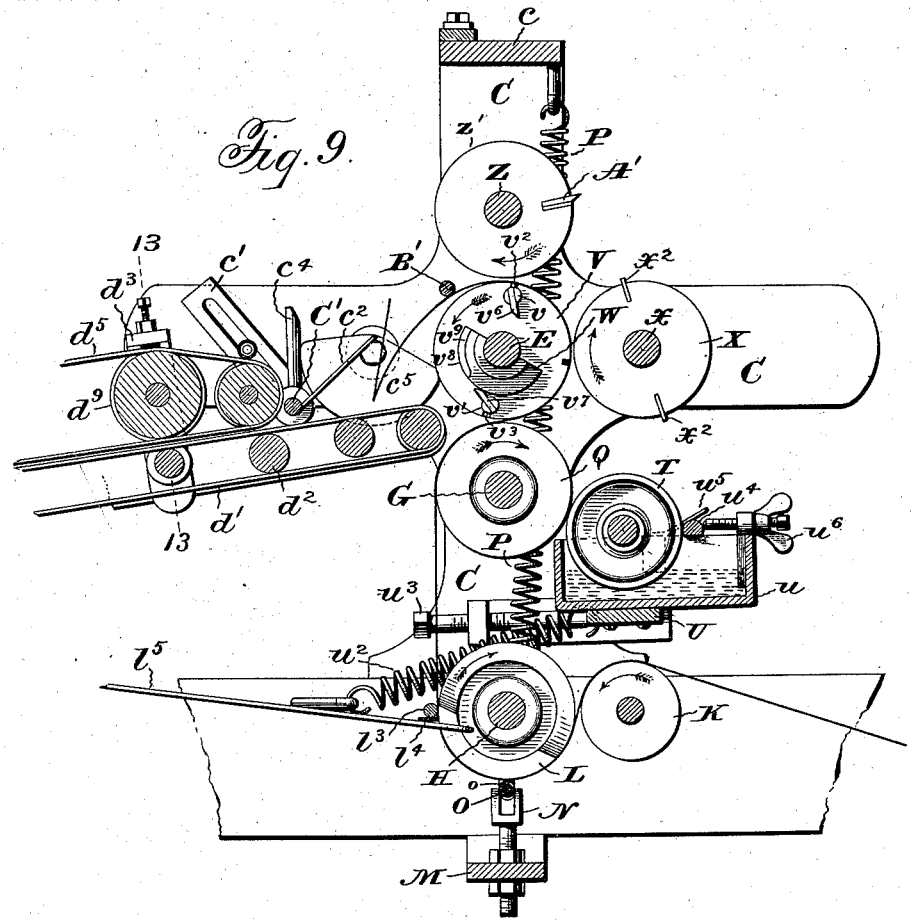
Figure 13:
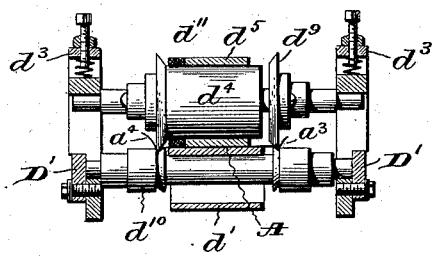

Figures 1 to 4, inclusive, are views illustrating the steps followed in making one form of safety-envelop by my method. Fig. 5 is a side elevation of a machine adapted to make envelops according to my method. Fig. 6 is a rear view of said machine, the belt-conveyers and flap-folding parts being removed. Fig. 7 is a similar view to that of Fig. 1 taken from the opposite side, such view being on a larger scale than said figure and parts at both ends of the machine being broken away. Fig. 8 is a plan view of the rear portion of the machine, the upper lap of the upper belt being omitted. Fig. 9 is a sectional view of the central portion of the machine, taken on the line 9 9 of Fig. 6. Fig. 10 is a diagrammatic view of the chief operating parts of the machine. Fig. 11 is a sectional view of the conveyer, taken on the line 11 11 of Fig. 7. Fig. 12 is a partial sectional view of the conveyer, taken on the line 12 12 of Fig. 8. Fig. 13 is a sectional view of the conveyer and creasing-rolls, taken on the line 13 13 of Fig. 9. Fig. 14 is a top plan view of the glue-pan and glue-transfer roll and their attached parts. Fig. 15 is a sectional view of the glue-applying devices. Fig. 16 is a side elevation of the rolls carrying the glue-applying type-bar, and Fig. 17 is an elevation of the cutting-cylinder.

The object of my invention is to provide a method of making envelops from a continuous strip of paper; and to such end my invention consists in the method substantially as hereinafter specified and claimed.

To illustrate my method, I show and shall describe a machine by which the method can be practiced, which machine forms the subject of an application for patent filed by me the 28th day of June, 1902. It is to be understood, however, that I restrict myself to no particular machine or instrumentality for the practice of my method. The machine which I have chosen for illustration is fitted to make the envelop A. (Shown in Figs. 1 to 4.) Such envelop is formed from a blank, (illustrated in Fig. 1,) such blank consisting of a strip having parallel sides, the central portion of the strip being wider than its ends, and the edges of such wider portions being connected with the said ends by oblique edges. In forming the envelop one of the ends $a'$ is first turned over upon the body portion of the blank, as illustrated in Fig. 2. The opposite end $a^2$ is then turned over and secured to the first end, as illustrated in Fig. 3. The wider portion of the blank constitutes beside the body a narrow flap $a^3$ and a wider flap $a^4$. The narrow flap is turned over upon the ends $a'$ and $a^2$ and is secured thereto, thus closing the bottom of the envelop. The wider or upper flap $a^4$ is provided with glue or other adhesive material and is then turned over, but is not secured to the ends $a'$ and $a^2$. The flap $a^4$ is the flap which is sealed by the user in closing the envelop. Said machine has a frame which consists of parallel horizontal beams B, which are suitably supported, as by legs $b$, and upon such beams are side frames C in the form of a Greek cross, the side frames C being connected at the top by a cross-bar $c$. Means are provided upon the beams B to support a roll of paper D. A driving-shaft E is journaled to the center of the side frames C, and upon one end of such driving-shaft are the usual fast and loose pulleys, while upon the other end a pinion F is fixed. Beneath the driving-shaft a shaft G is mounted in the side frames, such shaft having a pinion $g$, which meshes with the pinion F on the driving-shaft. Beneath the shaft E is a shaft H, having fixed thereon a pinion $h$, which is geared to the pinion F by an idler I. In the rear of the shaft H a shaft carrying a guide-roller K is journaled.

Upon the shaft H the cutting-cylinder L is mounted. Such cylinder has a periphery whose form when developed is preferably that of the blank from which the envelop is to be made. The cutting-cylinder, as illustrated in Figs. 6 and 17, has a body which is fixed upon the shaft and which has portions $l$ of smaller diameter separated by a central portion $l'$ of larger diameter. Sleeve-sections $l^2$ are mounted upon the portions $l$ of smaller diameter. The portion $l'$ is of the same diameter as the peripheries of the portions $l^2$. The outer edges of the sleeve-sections are made of the shape which it is desired to give the edges of the blanks and may be varied as desired, according to the envelop which is to be made. The sleeve-sections are preferably made of hardened steel, and the outer edges are preferably made sharp, the surfaces at such edges preferably meeting at a right angle, although such edges and angle can be varied as desired or as circumstances may require. A rod $l^3$ is secured in the frame parallel and near to the rear face of the cutting-cylinder, and such rod preferably has a plate $l^4$ secured upon its under side. Spring-rods $l^5$ are secured to the frame, extend under and bear upon the plate $l^4$, and yieldingly rest against the edges of the cutting-cylinder. The tension of the said rods is upward and toward each other, so that they constantly touch the cutting edges of the cutting-cylinder and strip off any cuttings that are formed. A bar M extends across the frame beneath the beams B, and threaded bolts N are mounted vertically on the said bar, as by nuts engaging the threaded portions of the bolts upon opposite sides of the said bar. The said bolts are forked at their upper ends, and cylindrical rods or shafts O are pivoted in the said forks. Cutting-rolls $o$ are journaled upon said rods, being held from lateral movement by collars $o'$, which are secured upon the said rods. The said cutting-rolls are preferably of hardened steel and are held against the edges of the cutting-cylinder by springs P, that are supported at their upper ends upon hooks fastened in the top cross-bar $c$ and that support the rods O by rings $o^2$, secured to the lower ends of the said springs and engaging notches on the under sides of the rods O. The cutting-rolls stand at an angle to the periphery of the cutting-cylinder, and such angle may be adjusted by means of the nuts on the bolts N. The angle at which the cutting-rolls stand to the periphery of the cutting-cylinder can be varied, as desired, from a very acute angle to or beyond a right angle.

Upon the shaft G the glue-applying devices are mounted, such devices, in the instance chosen for illustration, comprising disks Q, which may be of equal radius throughout their peripheries or may be higher in those portions where it is desired to apply the glue. Between the disks Q is, as shown in Figs. 6, 15, and 16, a cylinder R, which is of smaller diameter than the disks Q and which has secured to it, as by dovetailing, a type-bar S, which extends parallel with the shaft E and whose outer face is flush with the peripheries of the disks Q. Glue is supplied to the disks Q and the bar S by a roller T, the latter being mounted on a shaft in bearings upon a bar U, upon which is also mounted a rectangular glue-pan $u$. The shaft of the glue-applying roller is provided with a pinion $u'$, that meshes with the pinion $g$, before described. The bar U engages guides formed in arms that are secured to the side frames. Springs $u^2$ are connected to the frame and to the bar $u$ and tend to draw the glue-pan toward the glue-applying devices, the movement in such direction being limited by screws $u^3$, that are threaded in the said arms. A scraper-bar $u^4$ rests upon the upper edges of the glue-pan forward of the glue-transferring roller T, and such bar is held down upon the said edges by leaf-springs $u^5$, that are pivoted upon lugs formed on the glue-pan. The said springs are bent at an angle to the edges of the glue-pan, so that they tend to force the bar away from the glue-applying roller. Thumb-screws $u^6$ regulate the distance at which the scraper-bar stands away from the glue-transferring roller under the action of the said springs.

A draw-folding roller V is mounted upon the driving-shaft E. The said roller is provided with shafts $v$ and $v'$, respectively, which are mounted in cylindrical bearings formed near the periphery of the said roller and parallel to the axis of the same. Draw-folding blades $v^2$ and $v^3$ are mounted upon the shafts $v$ and $v'$, respectively, the said blades occupying slots opening from the bearings of the said shafts to the periphery of the roller. The shafts $v$ and $v'$ are each provided upon one end with an arm $v^4$ and $v^5$, respectively, which, as shown in Fig. 10, are engaged by springs $v^*$, the opposite ends of which are secured to pins $v^{**}$ in the end of the roller. The shafts are thus normally turned to press the draw-folding blades against one wall of the said slots, such wall being, preferably, the rearward wall when the blade $x$ in its travel is above the driving-shaft. Upon the opposite ends of the said shafts from the arm referred to are tappets $v^6$ and $v^7$, respectively, which are adapted to engage cams $v^8$ and $v^9$, respectively, the latter being formed upon a sleeve or partial sleeve W, which is supported on one of the side frames C and extends along the under side of the driving-shaft E. The said cams are formed at different points along the said sleeve, and the said tappets are correspondingly placed, so that each tappet engages its cam without interference from the other. The action of the said cams is to turn the shafts $v$ and $v'$ against the stress of the springs attached thereto, and thus to move the draw-folding blades away from the rear walls of their respective slots. An elastic flap $v^{10}$ is secured at one end in a recess in the periphery of the draw-folding roller, such end being the lower end when upon the rear side of the said roller. The said flap is preferably formed so that its free end normally stands away from the face of the roller.

A tucker-roll X is mounted upon a shaft $x$ in the forwardly-extending arms of the side frames, which shaft is provided with a pinion $x'$, that engages the pinion F on the driving-shaft. The tucker-roll is provided with tucker-blades $x^2$, which serve to tuck a fold of paper back of the draw-folding blades when the latter are moved away from the rear walls of their respective slots. A shaft Z is mounted in the upper arms of the side frames C and is provided with a pinion $z$, which engages the pinion upon the driving-shaft. A roller $z'$ is mounted upon the shaft Z, and a knife A', with a serrated edge, is seated in a radial slot in the said roller. The roller V is provided with a groove that is adapted to receive the edge of the said knife. A rod B' extends between the side frames parallel to but separated from the upper rear portion of the periphery of the draw-folding roller.

A shaft C' is journaled in bars $c'$, that are adjustably secured to the inner faces of the rear arms of the side frames, as by screws passing through slots in the said arms and into the side frames. A folding blade or plate $c^2$ is secured to the said shaft and is normally held downward by a spring $c^3$, (shown in Fig. 8,) that is secured to the frame and to an arm on the said shaft. The shaft is rocked and the plate is raised by the action on an arm $c^4$, secured to the said shaft of a cam $c^5$, that is secured to the inner end of a short shaft journaled in the adjacent side frame, the outer end of the said shaft being provided with a pinion $c^6$, that meshes with the pinion on the driving-shaft.

A frame consisting of two side bars D', that are connected by a series of shafts, is mounted at the rear of and between the side frames C. The bars D' are supported by bars $d$, that extend down to and are secured to the beams B, as by bolts passing through slots in the said bars. A belt $d'$ passes over and under a series of rolls $d^2$, journaled upon the shafts connecting the bars D. The forward and rearward rollers of the said series are flanged or grooved to prevent lateral movement of the said belt. The belt $d'$ runs but a little below the shaft $c'$ and extends near the rear face of the draw-folding roller V. A series of bearing-brackets $d^3$ extends upward from the bars D', and in the said brackets are mounted a series of rolls $d^4$, the said brackets being slotted to receive the ends of the shafts of the said rolls, so that such rolls can rise and fall. A belt $d^5$ extends over and under the said upper series of rolls and is pressed by the said rolls against the belt $d'$ at points over the rolls of the lower series. The belt $d^5$ is at least as narrow as the distance between the top and bottom flaps $a^4$ and $a^3$ of the envelop, while the belt $d'$ is wider than the belt $d^5$. The rear walls of the two series upon which the belts are mounted are geared together, and the lower of such rolls is mounted upon a shaft $d^6$, that is provided with a bevel-pinion $d^7$, which pinion engages a bevel-pinion upon a shaft $d^8$, the latter receiving motion by the intermeshing of a bevel-pinion upon its forward end with a similar pinion upon the shaft H of the cutter-cylinder. The shaft of the second roll from the forward end of the upper series of rolls is provided with scoring-disks $d^9$, which engage scoring-rolls $d^{10}$ upon the shaft immediately below it. Such second roll is provided with an enlargement, preferably in the form of a rubber band $d^{11}$, which is of the same thickness as the belt $d^5$ and is adjacent to the portion of such roll which engages said belt, so that the portion of the envelop which will be covered by the sealing-flap is held firmly during the scoring operation. At the rear of such second roll upon a plate E, which is supported upon the bars D', is a deflector F', which is provided with a warped surface for the purpose of raising the sealing-flap ready to be folded over upon the back of the envelop. A similar deflector G' is mounted upon a plate H' on the opposite side of the belt $d'$ for raising the bottom flap $a^3$ of the envelop preparatory to folding it down and sealing it. Folding-plates I' and K', respectively, are secured upon the plates E' and H' to the rear of the deflectors F' and G' to gradually fold down the top and bottom flaps of the envelop. An upper roller L' is provided with a band M', similar to the band $d^{11}$, for the purpose of pressing the bottom flap of the envelop firmly upon the flaps $a'$ and $a^2$ to secure the same thereto, and the folding-plate K' is cut away to permit said roller to reach the envelop. A plate N', secured to the plate H' at the rear of the folding-blade K', serves to hold the bottom flap down after leaving the roller L'. The folding-blade I' does not fold the sealing-flap of the envelop down upon the flaps $a'$ and $a^2$, but leaves such flap standing sufficiently away from the envelop to prevent accidental sealing. The fold between the sealing-flap and the front of the envelop is sharpened to the desired extent by being passed between an upper roller O', which extends over the said fold and the flap, and a lower roller P', the said rollers contacting only along the said fold, and the lower roller being beveled, so that its face recedes from the face of the upper roller toward the belt $d'$, as shown in Fig. 11. A horizontal conveyer-belt Q' passes over a pulley R', journaled in the beams B immediately below the exit between the belts $d'$ and $d^5$. The pulley R' is operated intermittently by a pawl S', mounted upon a lever T', the latter being journaled upon the shaft of the said pulley, and the pawl engaging a ratchet fixed upon the said shaft. A spring U', secured to the said lever and to the frame, tends to draw the upper end of the lever forward. A cam V' on the shaft $d^6$ causes the said lever to oscillate rearward, thus giving the pulley R' its intermittent movement.

In the practice of my method with the machine illustrated the paper is led by hand over the roller K under the cutting-cylinder, upward and around the glue-applying disks Q, and thence between the tucker-roller X and the draw-folding roller V. The machine is then set in motion, and as one of the draw-folding blades $v^2$ comes to the level of the shaft F it is moved away from the rear wall of its slot and a fold is formed in the paper and is tucked behind the draw-folding blade by one of the tucker-blades $x^2$. The paper having thus been engaged by the draw-folding roller is drawn forward. Preferably neither the glue-applying disks, the tucker-roller, nor the cutter-carrying roller come in contact with the periphery of the draw-folding roll, so that the feeding of the paper is effected solely by the draw-folders and the tucker-blades. As the paper passes over the cutter-cylinder the cutter-rolls O are drawn firmly against the edges of such cylinder by the springs P and cause the paper to be sharply severed along the edges of the said cylinder, the springs P causing said rollers to follow the cutting edges of the cutting-cylinder and in a most effective and simple manner thus to cut the edges of the strip of paper to conform to the periphery of the cutting-cylinder. In practice I have found this cutting mechanism to be exceedingly simple and effective and adapted to a wide variety of forms. As the paper travels upward on the rear side of the cutting-cylinder the springs $l^5$ engage the severed portions of the paper and detach them should they not already have fallen away. The tension of the said springs toward each other causes them to closely follow the cutting edge of the cylinder, so that they always act along the line of cutting and most effectively separate the severed portions from the strip of paper. As the paper passes upward from the cutting-cylinder and over the glue-applying disks Q the latter apply glue to the upper and lower flaps $a^4$ and $a^3$, respectively, of the envelop. At the same time the type-bar S applies glue to a portion of the under face of the end flap $a'$. As the paper passes upward between the draw-folding roller and the tucker-roller a fold is formed along the line between the end flap $a'$ and the body of the envelop, the said flap extending forward along the face of the draw-folding cylinder. As the said roller carries the paper onward the end flap $a'$ runs over the rod B', and when the fold at the base of the said flap is carried beneath the said rod by the movement of the draw-folding roller the said flap is turned back upon the envelop into the position shown in Figs. 2 and 9. As the line between the end flap $a^2$ and the body of the envelop approaches the plane of the shafts of the draw-folding and tucker rollers, the second tucker-blade $x^2$ forms a fold in the paper and tucks it behind the second draw-folder $v^3$. As the formation of this second fold requires some slack in the paper, it may be secured by forming the cam $v^8$, which operates the forward draw-folder, so that said draw-folder releases its fold just before the second fold is formed, or the slack for the second fold can be obtained by drawing the paper forward from the roll of paper instead of allowing it to slip backward from the first draw-folder. As the draw-folding roller continues its movement the elasticity of the paper causes the body of the envelop to stand away from the draw-folding cylinder and to project into the space between the folding blade or plate $c^2$ and the lower belt $d'$. The cutter A' presses against the paper over the groove in the draw-folding roller and severs the paper. As the paper is under tension, this can be done without causing the cutter to cut against an edge or surface. Further movement of the said roller causes the forward end of the body of the envelop to travel rearward until it is engaged between the belts $d'$ and $d^5$. At about this time, as illustrated in Fig. 10, the rearward flap $a^2$ of the envelop is bent rearward and downward by the elastic strip $v^{10}$ until said flap $a^2$ is beneath the folding plate or blade $c^2$. The latter is then moved downward, causing the flap $a^2$ to overlie the flap $a'$ in position to pass rearward between the belts $d'$ and $d^5$. The second draw-folder now releases the envelop and it passes rearward between the said belts. As the envelop passes between the scoring-disks $d^9$ and the scoring-roll $d^{10}$ (see Fig. 13) the scores between the body of the envelop and the top and bottom flaps $a^4$ and $a^3$, respectively, are formed. This action also causes such flaps to stand at an angle to the body of the envelop. The motion of the belts carries the said flaps against the deflectors F' and G', which latter raise the flaps farther up. The said flaps then come in contact with the folding-blades I' and K', respectively, and the bottom flap is turned down upon the top and bottom flaps $a'$ and $a^2$ and is firmly secured thereto by the pressure of the band M' against the roller and belt beneath. The upper flap, as stated, is turned over, as shown in Fig. 11, and the crease at its base is completely formed between the rollers O' and P', respectively; but such flap is not brought into contact with the back of the envelop. The envelop then passes from between the belts $d'$ and $d^5$ upon the belt Q', which by its step-by-step movement causes the envelops to accumulate in a position in which they overlie each other and are readily gathered into bunches.

Having thus described my invention, what I claim is—

1. The method of forming envelops, which consists in shaping the edges of a strip of material to form envelop-flaps, applying adhesive material to one face of said strip, severing a blank from said strip, folding the end flaps of said blank, and folding the side flaps of said blank, the several steps taking place in the order stated.

2. The method of forming envelops, which consists in trimming the edges of a strip of material to form envelop-flaps, applying adhesive material to said strip, folding the free end flap, severing the blank from the strip, folding the end flap thus formed, and then folding the side flaps.

3. The method of forming envelops, consisting in shaping the edges of a strip of material to form envelop-flaps, applying adhesive material to said strip at a single operation, folding the free end flap, severing the blank from the strip, folding the flap thus formed, and then folding the side flaps of the blank.

4. The method of forming envelops, consisting in shaping the edges of a strip of material to form envelop-flaps, applying adhesive material to said strip before any of the flaps are folded, severing the blank from the strip and also folding the flaps, after the adhesive material has been applied.

In testimony that I claim the foregoing I have hereunto set my hand.

JAMES WEST.

Witnesses:
EDWARD STEVENSON,
T. WM. KIENAST.